(12) United States Patent
Schmidt

(10) Patent No.: US 7,097,142 B1
(45) Date of Patent: Aug. 29, 2006

(54) ONE-PIECE RESILIENT STACKABLE HANGER

(75) Inventor: Frederick Schmidt, Frankfort, IL (US)

(73) Assignee: Beverly Manufacturing Company, Tinley Park, IL (US)

( * ) Notice: Subject to any disclaimer, the term of this patent is extended or adjusted under 35 U.S.C. 154(b) by 21 days.

(21) Appl. No.: 10/640,181

(22) Filed: Aug. 13, 2003

(51) Int. Cl.
  *F16L 3/22* (2006.01)
(52) U.S. Cl. .................. 248/68.1; 248/74.2; 248/71
(58) Field of Classification Search ............. 248/74.2, 248/68.1, 71, 73, 74.3; 211/85.18; 343/890, 343/891, 892, 874; 138/106, 107, 111
See application file for complete search history.

(56) References Cited

U.S. PATENT DOCUMENTS

| | | | | |
|---|---|---|---|---|
| 2,065,843 A | * | 12/1936 | Uum | 248/73 |
| 4,395,009 A | * | 7/1983 | Bormke | 248/68.1 |
| 4,479,625 A | | 10/1984 | Martz | 248/74.1 |
| 4,763,132 A | | 8/1988 | Juds et al. | 343/890 |
| 4,813,639 A | | 3/1989 | Midkiff et al. | 248/68.1 |
| 5,108,055 A | * | 4/1992 | Kreinberg et al. | 248/71 |
| 5,280,866 A | * | 1/1994 | Ueki | 248/74.2 |
| 5,393,021 A | | 2/1995 | Nelson | 248/71 |
| 5,612,509 A | * | 3/1997 | Market | 174/53 |
| 5,794,897 A | | 8/1998 | Jobin et al. | 248/74.4 |
| 5,967,468 A | | 10/1999 | Veghte et al. | 248/71 |
| 6,161,804 A | * | 12/2000 | Paske et al. | 248/74.1 |
| 6,354,543 B1 | | 3/2002 | Paske | 248/68.1 |
| D461,396 S | | 8/2002 | Ferrill et al. | D8/373 |
| 6,443,402 B1 | | 9/2002 | Ferrill et al. | 248/65 |
| 6,508,440 B1 | | 1/2003 | Schmidt | 248/62 |
| 6,622,976 B1 | * | 9/2003 | Ianello | 248/73 |
| 6,899,305 B1 | * | 5/2005 | Korczak et al. | 248/68.1 |
| 2002/0005463 A1 | | 1/2002 | Paske et al. | 248/74.1 |
| 2003/0089828 A1 | * | 5/2003 | Korczak et al. | 248/68.1 |
| 2003/0089829 A1 | * | 5/2003 | Brandzel et al. | 248/68.1 |

* cited by examiner

*Primary Examiner*—Amy J. Sterling
(74) *Attorney, Agent, or Firm*—Wood, Phillips, Katz, Clark & Mortimer

(57) ABSTRACT

A one-piece, resilient, stackable hanger, which is preferably substantially U-shaped, adapted to attach a cable to a substantially flat surface defining an aperture. The hanger supports cable in a straddling relationship when snapped into an aperture of a supporting structure or another complementary hanger. The hanger has spaced-apart legs extending from the center portion. The center portion has two coplanar areas to provide a base for second hanger being stacked on the first hanger. The center portion has a mounting aperture in a recessed area, which is between the two adjacent coplanar areas, wherein the mounting aperture is adapted to allow a second hanger to be secured and stacked on the first hanger. The stackable hanger can straddle a cable and be easily installed by hand by squeezing, inserting, and snapping into an aperture to support the cable.

23 Claims, 2 Drawing Sheets

ONE-PIECE RESILIENT STACKABLE HANGER

BACKGROUND OF THE INVENTION

The present invention relates to a one-piece, resilient, stackable hanger adapted to secure cable to substantially flat supporting structures that define an aperture, such as a cross bar of an antenna tower, or another stackable hanger. The stackable hanger can straddle a cable and be easily installed by hand by squeezing, inserting, and snapping into an aperture to support the cable.

Hangers are known to attach cable or waveguides to a supporting structure, such as antenna systems and towers. Numerous hangers hold cable to supporting structures and are removably mounted in apertures, which are typically 0.75 inch. Hangers have been developed from one piece to ease installation with only one hand. Great advantages are derived from avoiding mounting hardware and tools. Prior one-piece hangers can be installed by hand and do not require additional hardware.

One type of hanger that can be attached to an antenna tower is shown in expired U.S. Pat. No. 4,763,132, which is incorporated herein by reference. The one-piece hanger is a resiliently yieldable U-shaped clip including two spaced-apart legs adapted to straddle an elliptical waveguide and snap into a hole of a supporting structure. Beverly Manufacturing Company also sold a hanger that was similar to this hanger, but was more rounded (rather than elliptical), had additional teeth and a small hole in the bridge to ease flexing. This unstackable hanger is shown in FIG. 3 of this disclosure as the uppermost hanger. Another hanger is shown in U.S. Pat. No. 6,443,402 that is not stackable, and the hanger has a slot that defines a torsion spring. All of these disclosures include similar legs and feet with detents that are similar to the preferred embodiment of the present invention. However, the center portions between the spaced-apart legs are distinct.

One of the shortcomings with certain hangers is that they cannot be readily used with multiple runs of cable. Often, it is advantageous to run multiple cables up a tower. Other cable hangers and systems were made for multiple runs of cable.

An early solution was a cluster mounting system shown in U.S. Pat. No. 4,813,639. This generally is a band or strip whose ends are brought together wherein individual hangers are mounted side-by-side in apertures in the strip. Another solution was to make hangers stackable.

One set of related patents include U.S. Pat. No. 6,161,804; U.S. Pat. No. 6,354,543; and Patent Application Publication U.S. 2002/0005463A1 that show transmission line hangers. U.S. Pat. No. 6,161,804 discloses a transmission line hanger, but does not disclose a stackable embodiment. U.S. Pat. No. 6,354,543 shows a stackable embodiment with a lip on part of the aperture on an otherwise substantially flat mounting section. U.S. Patent Application Publication U.S. 2002/0005463A1 is a continuation-in-part of the application that issued as U.S. Pat. No. 6,354,543, which are both incorporated herein by reference. FIGS. 14 and 15 of the published application show a circular mounting hole and a lip surrounding the entire mounting hole on an otherwise substantially flat mounting section. This may disclose the closest prior art, but the mounting section and aperture are distinct from the present invention.

Other prior art devices are complicated and cumbersome and are inconvenient, awkward, and difficult to manufacture, handle and operate.

An object of this invention is to minimize the time and labor required to hang cable, especially multiple runs of cable. It has therefore been found beneficial to produce a one-piece hanger that can be easily and quickly used with only one hand. Also, it is significant to add additional hangers with cable to existing stackable hangers.

Moreover, it would be significant in the industry to provide a stackable hanger that provides a sturdy base for other hangers that are stacked on the first hanger. The present stackable hanger provides both coplanar bases and a recessed area between the coplanar bases to provide additional structural support and resistance to the stress of having a second hanger stacked on the first hanger.

These and other objects and advantages of the invention will be apparent from the following description, the accompanying drawings and the appended claims.

SUMMARY OF THE INVENTION

The one-piece, resilient, stackable hanger of the present invention improves the foregoing concerns and provides an easily manufactured, easily used, and reliable stackable hanger suitable for supporting cable, especially for antenna towers with multiple runs of cable. The present invention provides a hanger that can be easily and efficiently manufactured preferably from a single unitary strip of resilient material.

The invention may be described as a one-piece, resilient, stackable hanger that is easily manipulated by squeezing, inserting, and snapping into an aperture without any other component or step. The one-piece hanger does not have multiple parts that must be assembled or that could vibrate apart. In a preferred embodiment, the U-shaped, one-piece, resilient, stackable hanger is adapted for attachment of a cable to a surface defining an aperture or another hanger having a complementary mounting aperture. The present hanger is easy to install for securing one or more cables to a supporting structure or another stackable hanger.

The hanger can snap into an aperture, but the stackable hanger also has its own mounting aperture in the center portion between the spaced-apart legs to allow another hanger to stack on the first hanger. The center portion has two coplanar areas to provide a base for a hanger being stacked on the first hanger. Although described as coplanar, the areas are not defined as perfectly flat, and may include slight valleys that correspond to the feet of a stacked hanger.

The center portion of the hanger has a mounting aperture in a recessed area, which is in a substantially parallel plane to the adjacent coplanar areas, wherein the mounting aperture is adapted to allow a second hanger to be secured and stacked on the first hanger. The mounting aperture in the recessed area is typically about ⅛ inch recessed from the adjacent coplanar areas, which is the same distance as the normal thickness of a supporting structure. The recessed area between the coplanar areas provides additional structural support and resistance to stress of having a second hanger stacked on the first hanger. The recessed area makes the hanger more resistant to adverse bending or twisting, but assists in the flexing of the legs of the hanger. Also, the recessed area allows the mounting aperture to be coplanar with the recessed area.

The present invention overcomes the need for assembly of more than one part during both the manufacture of the one-piece, resilient, stackable hanger and during installation of the cable secured by the one-piece hanger. Numerous cables can be supported efficiently and inexpensively using one-piece, resilient, stackable hangers of the present invention.

BRIEF DESCRIPTION OF THE DRAWINGS

The above mentioned and other features of this invention and the manner of obtaining them will become more apparent and the invention itself will be best understood by reference to the following description of embodiments of the invention taken in conjunction with the accompanying drawing in which.

DETAILED DESCRIPTION OF THE INVENTION

While the present invention will be described fully hereinafter with reference to the accompanying drawings, in which a particular embodiment is shown, it is to be understood at the outset that persons skilled in the art may modify the invention herein described while still achieving the desired result of this invention. Accordingly, the description that follows is to be understood as a broad informative disclosure directed to persons skilled in the appropriate art and not as limitations of the present invention.

Figure 1:
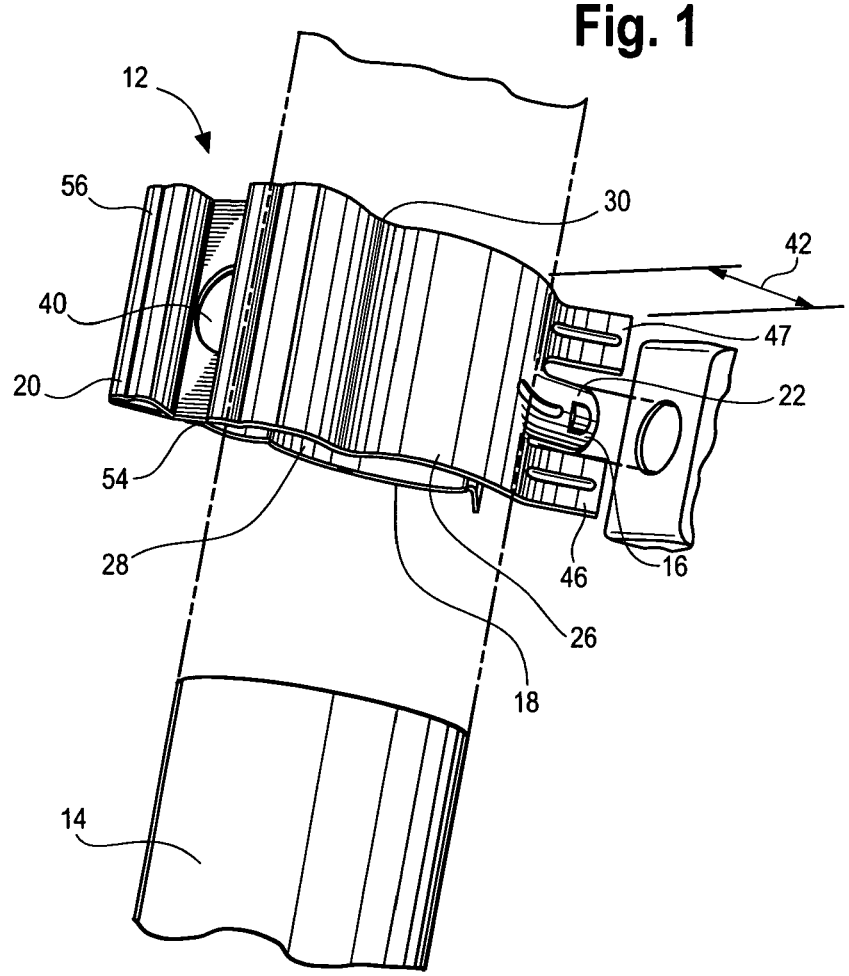
FIG. 1 is a perspective view of a hanger showing how the cable and aperture relate to the hanger.

In the Figures, like reference numerals indicate the same elements throughout. FIG. 1 shows a one-piece, resilient, stackable hanger 12 that can be used to attach cable 14 or the like to a supporting structure, such as a tower. Although shown as horizontal attachments, hangers may be mounted vertically or otherwise. Normally hangers are attached every few feet to secure cable so that numerous hangers are used on a tower. By way of illustration, the hanger 12 supports cable 14 in a straddling relationship when snapped into an aperture of supporting structure or another stackable hanger. Although the preferred embodiment of the invention is illustrated and described in connection with these specific cables, it can be adapted for use with a wide variety of conduit, pipe, or tubing. The stackable hanger 12 can be used to quickly and easily install multiple runs of cable. The one-piece hanger 12 can be easily installed without additional hardware or tools by squeezing by hand, inserting, and releasing applied pressure.

The stackable hanger 12 may be made from a single unitary strip of resilient material, such as a continuous stainless steel sheet metal having a thickness of about 0.03 inch (about $\frac{1}{32}$ of an inch) as an example, or the hanger may be molded of a suitable non-metallic substance, such as plastic. Each feature of the preferred hanger 12 can be made from one continuous piece of material, preferably metal (although some types of plastic may be acceptable). A stamped flat strip is bent generally in a U-shape to form transversely spaced-apart legs 16 and 18 and a center portion 20 between the legs 16 and 18. The hanger 12 can be made of a strip of sheet metal that is cut, stamped, punched and bent, wherein all parts are preferably formed from the same piece of metal as the entire hanger 12. However, a hanger 12 may be formed of plastic or other resilient materials. The preferred material must be rigid, although flexible, so that the hanger 12 will flex together when pressure is applied on the legs 16 and 18 with a return to the original shape of the hanger 12 when pressure is released. The resilient material enables the legs 16 and 18 of the hanger 12 to be (1) readily expanded to allow passage of the cable 14, (2) compressed to insert the prongs 22 and 24 of the legs 16 and 18 into an aperture, and (3) released to engage the aperture to secure the cable 14. The hanger 12 is inexpensive to produce and easy to use.

Figure 2:
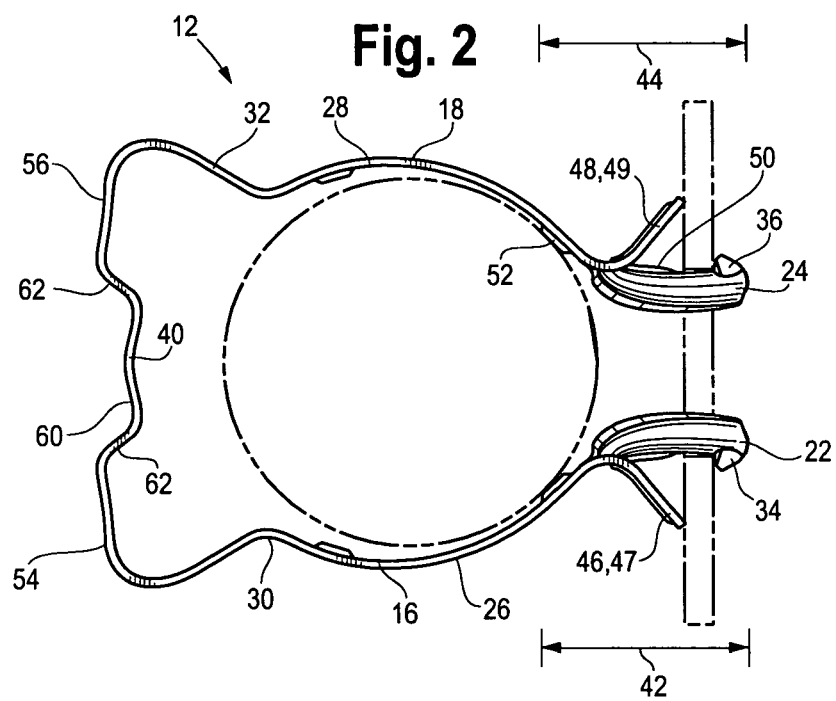
FIG. 2 is a side view of a hanger.
Figure 3:
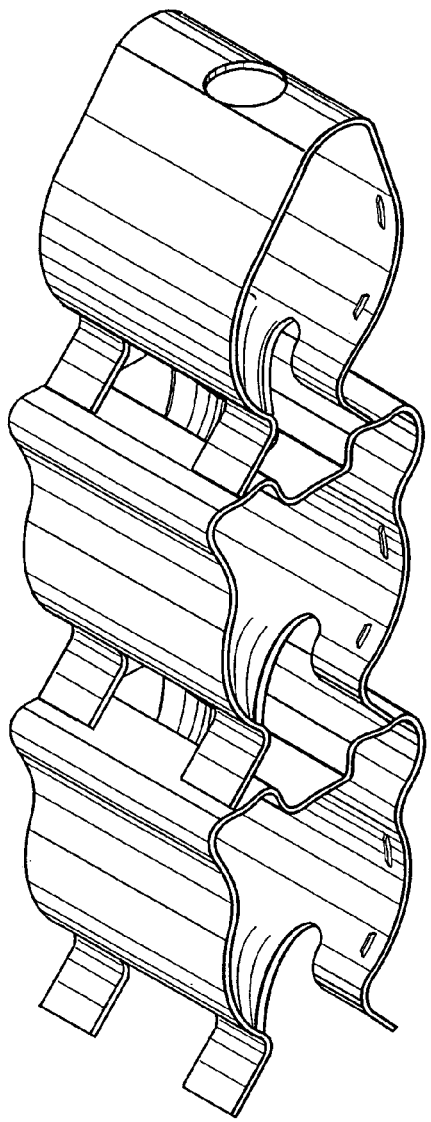
FIG. 3 is a perspective view of several hangers, including a prior art hanger as the uppermost hanger.
Figure 4:
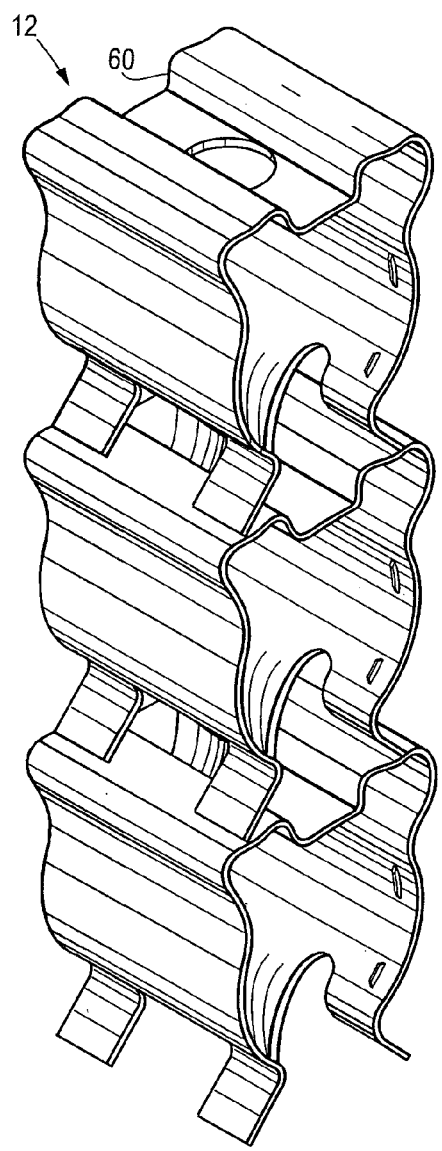
FIG. 4 is perspective view of several stackable hangers in a stacked arrangement.

As shown in FIG. 2, the hanger 12 is preferably substantially U-shaped in its cross section. Cable engaging sections 26 and 28 are provided in each leg 16 and 18 respectively. Cable engaging sections 26 and 28 are preferably shaped similarly to the shape of a cable 14. The cable engaging section 26 and 28 of each leg 16 and 18 respectively define the inner surface to be preferably concave to correspond with the shape of a standard cable that the hanger 12 will hold.

The legs 16 and 18 are resilient to flex apart to allow the cable 14 to be inserted therein. The legs 16 and 18 can also be flexed together. Legs 16 and 18 extend each end of the center portion 20. The legs 16 and 18 are joined at the ends of the center portion 20 with a compliant area 30 and 32 respectively. The compliant areas 30 and 32 of the legs 16 and 18 bend in the opposite direction from the concave cable engaging sections 26 and 28, whereby forming a compliant area 30 and 32 to better enable the legs 16 and 18 to flex. The compliant areas 30 and 32 assist appropriate flexing when pressure is applied to the legs 16 and 18 to squeeze or separate the legs 16 and 18. The compliant areas 30 and 32 enable the hanger 12 to accommodate various sizes of cable. The compliant areas 30 and 32 are disposed between the center portion 20 and the cable engaging sections 26 and 28 to allow the legs 16 and 18 to be pressed toward each other and to expand away from each other by spring force, thus allowing the detents 34 and 36 to fit through an aperture or mounting aperture 40 and be released.

The legs 16 and 18 are adapted to attach into an aperture. The distal end of the legs 16 and 18 include attachment sections 42 and 44 respectively having feet 46 through 49, prongs 22 and 24, and means for engaging the flat surface surrounding the rim of an aperture, such as detents 34 and 36. Preferably two feet (i.e. 46 and 47) are formed on the outer sides of each leg (i.e. 16) as outwardly bent or curved to extend away from the feet (i.e. 48 and 49) of the opposing leg 18. The feet 46–47 and 48–49 are on each side of the prong 22 and 24 respectively, and are ideally curved and extend away from the prong 22 and 24 respectively. The feet 46–49 are adapted to engage a flat surface surrounding an aperture into which the prongs 22 and 24 are inserted. While four feet (46–49) per hanger 12 are particularly effective, the number of feet may be changed, if desired. When the hanger 12 is installed, the feet 46–49 will limit the movement of the hanger 12 relative to the supporting structure or another base hanger 12 (if stacked).

Legs 16 and 18 may include a prong 22 and 24 respectively that is preferably concave inwardly facing to the opposing prong to form a shape that conforms to a substantially round aperture. Preferred prongs 22 and 24 are generally semi-circular in the radial cross section, curved on substantially the same radius as a rounded aperture. Convex prongs as shown in U.S. Pat. No. 5,393,021 may also be used. The tips of the prongs 22 and 24 are inwardly tapered to ease insertion in an aperture.

The prongs 22 and 24 of legs 16 and 18 are adapted to be inserted into an aperture to releasably attach the hanger 12 and the cable 14 that is being supported to a supporting structure or another stackable hanger 12 already attached to a supporting structure. When pressure is removed from the legs 16 and 18 that were flexed together, the legs 16 and 18 regain the original position, and the prongs 22 and 24 would engage the rim of an aperture, if installed.

The prongs 22 and 24 of the legs 16 and 18 preferably include detents 34 and 36 extending from the outer side of the prongs 22 and 24. Once the prongs 22 and 24 of the legs 16 and 18 are inserted in an aperture and relaxed, the prongs 22 and 24 press against the rim of the aperture and the detents 34 and 36 hold the prongs 22 and 24 of the legs 16 and 18 in the aperture by engaging the flat surface surrounding the rim of the aperture. The detents 34 and 36 resist extraction of the hanger 12 from the aperture until the legs 16 and 18 are squeezed so the detents 34 and 36 no longer engage the surface surrounding the rim of the aperture. Each detent 34 and 36 is shear-formed with an outwardly concave cup having a shoulder that engages the flat surface around the rim of the aperture.

Although the exemplary and preferred embodiment includes standard detents, the means for engaging the surface surrounding the aperture may also include a locking barb. Locking barbs are another distinct type of means for engaging, which are configured to lock against the surface surrounding an aperture as a folded piece or a lip that engages the surface surrounding the aperture with a single contact point on each barb. In accordance with an alternate embodiment of the present embodiment, the locking barbs of Publication US 2002/0005463 A1 or U.S. Pat. No. 5,393,021, incorporated herein by reference, could be the means for engaging the surface surrounding the aperture.

Ridges can be formed in any surface of the hanger 12 to add structural strength to the hanger 12 across the surface. Any of these ridges may either extend outwardly from the hanger 12 or inwardly, such as into the cable engaging section 26 or 28. A strengthening ridge or gusset 50 can extend from each concave cable engaging section 26 and 28 onto the respective prong 22 and 24 as a stabilizer to keep the prongs 22 and 24 from flexing relative to the rest of the legs 16 and 18.

Numerous grips 52 can extend inwardly from the inner surface of the legs 16 and 18 to engage the surface of the cable 14. The series of grips 52 are preferable formed by indenting the wall of the cable engaging sections 26 and 28. The grips 52 may be V-shaped teeth to bite into the jacket of the cable 14 to more securely grip the cable 14. Various other contacts, fingers, and gripping tabs can also be used as cable gripping means, which generally project inwardly from any part of the hanger 12 to engage the jacket of the cable 14 to secure the cable 14 within the hanger 12.

The center portion 20 of the hanger 12 is the bridge between the spaced-apart legs 16 and 18. The center portion 20 acts as a hinge to assist the legs 16 and 18 in flexing apart and toward each other, and assists the legs 16 and 18 in springing back to the unstressed position.

The center portion 20 has two coplanar areas 54 and 56 to provide a base for feet of another hanger being stacked on the first hanger 12. Although described as coplanar, the areas are not defined as perfectly flat, and may include slight valleys that correspond to the feet 46–49 of another stacked hanger 12. The center portion 20 includes a recessed area 60 between the coplanar areas 54 and 56, including connecting walls 62 between the recessed area 60 and the coplanar areas 54 and 56. The connecting walls 62 extend in a direction which is substantially the same direction as the axial direction of a supported cable 14. The recessed area 60 is preferably in a parallel plane to adjacent coplanar areas 54 and 56. The recessed area 60 preferably extends completely across one axis of the center portion 20 with the recessed area 60 centered between the compliant areas 30 and 32 of each leg 16 and 18. The recessed area 60 is preferably substantially flat.

The recessed area 60 between the coplanar areas 54 and 56 provides additional structural support and resistance to stress of having a second hanger stacked on the first hanger 12. The recessed area 60 makes the hanger 12 more resistant to adverse bending or twisting, but assists in the flexing of the legs 16 and 18 of the hanger 12. Also, the recessed area 60 allows the mounting aperture 40 to be coplanar with the recessed area 60 without a lip or ledge.

The mounting aperture 40 is in the recessed area 60, wherein the mounting aperture 40 is adapted to allow a second hanger to be secured and stacked on the first hanger 12 using the mounting aperture 40. The mounting aperture 40 in the recessed area 60 is typically about ⅛ inch recessed from the adjacent coplanar areas 54 and 56, whereby the coplanar areas 54 and 56 together with the recessed area 60 provide an effective thickness which is the same distance as the normal thickness of a supporting structure but less than the thickness of the material forming the coplanar and recessed areas 54, 56, 60.

Although the preferred mounting aperture 40 is circular with a ¾ inch diameter, the mounting aperture 40 may also be square, such as with U.S. Pat. No. 6,161,804, or other shapes to accommodate attachment of other hangers.

A one-piece, resilient, stackable hanger 12 can be easily and efficiently installed to support cable 14. A preferred method of installing cable 14 using the resilient, one-piece hanger 12 comprises the steps of:

locating an aperture for attachment as described above;

obtaining a one-piece hanger 12 having a U-shaped member with a center portion 20 and two legs 16 and 18, the legs having a cable engaging section 26 and 28, a prong 22 and 24, preferably at least two feet (46–49), one on each side of each prong; the center portion 20 including a recessed area 60 between two coplanar areas 54 and 56 and the mounting aperture 40 in the recessed area 60;

expanding the legs 16 and 18 of the hanger 12 to straddle the cable 14 so that the cable engaging sections 26 and 28 engage the cable 14; this may be done by pushing the legs 16 and 18 on either side of the cable 14 so the legs 16 and 18 spread or by passing the cable 14 between the legs 16 and 18 when expanded;

applying pressure on the legs 16 and 18, such as with the operator's hand, to squeeze the legs 16 and 18 together so that the ends of the prongs 22 and 24 are closer together than the size of the aperture for insertion; and attaching the hanger-cable combination (12 with 14) by preferably inserting the prongs 22 and 24 inside an aperture so detents 34 and 36 pass through the aperture, and then releasing the applied pressure on the resilient hanger 12 so that the prongs 22 and 24 engage the rim of the aperture. When pressure is released, the detents 34 and 36 engage the flat surface adjacent the rim forming the aperture to aid the prongs 22 and 24 in staying in the aperture.

The process can be repeated with other hangers by attaching the next hanger-cable combination in a stacking arrangement into the mounting aperture 40 of the already attached hanger 12. Thus, multiple runs of cable can be attached with a series of stacked hangers 12.

Removal of the cable 14 from the hanger 12 is accomplished by squeezing the legs 16 and 18 and removing the prongs 22 and 24 from an aperture. The hanger 12 then no longer supports the cable 14. The legs 16 and 18 can be spread apart to remove the hanger 12 from the cable 14.

Although the preferred embodiment of the invention is illustrated and described in connection with particular features, it can be adapted for use with a variety of cables and towers. Other embodiments and equivalent hangers and methods are envisioned within the scope of the invention. Various features of the invention have been particularly shown and described in connection with the illustrated embodiments of the invention, however, it must be understood that these particular embodiments merely illustrate and that the invention is to be given its fullest interpretation within the terms of the appended claims.

What is claimed is:

1. A plurality of one-piece, resilient, stackable hangers adapted for attaching cables to a tower leg having a first thickness with an aperture therethrough, the hanger comprising:
    a generally U-shaped member having a center portion and legs;
    a cable engaging section in each leg adapted to engage a cable positioned between said legs in an axial orientation;
    a compliant area for flexing each of the legs in a direction transverse to the axial orientation; and
    an attachment section on the end of each of the legs opposite the center portion end of the legs;
    wherein
        the center portion includes
            an axially extending generally planar recessed area between coplanar areas, and
            an annular mounting aperture in the recessed area adapted for stacking engagement of an attachment section of a second hanger, wherein
                said recessed area and coplanar areas each have a second thickness less than said first thickness and have oppositely facing surfaces defining an effective thickness substantially equal to said first thickness, and
                said recessed area is connected to said coplanar areas by axially aligned connecting walls extending between the planes of the recessed and coplanar areas,
        said attachment section includes
            a prong adapted to extend through any one of said apertures,
            means for engaging a surface surrounding said any one of said apertures, and
            feet spaced no further than said first thickness from said associated engaging means in the direction of said thickness, and
        said coplanar areas are adapted to provide a base for the feet of a second hanger being stacked on the hanger.

2. The hangers of claim 1 wherein the mounting aperture is coplanar with the surface of the recessed area.

3. The hangers of claim 1 further comprising a cable gripper extending inwardly from the cable engaging sections.

4. The hangers of claim 1, each formed from a single unitary strip of resilient material.

5. The hangers of claim 4 wherein each hanger is formed from a continuous metal sheet.

6. The hangers of claim 1 wherein each attachment section includes a prong, feet, and means for engaging a surface surrounding a rim of the aperture.

7. The hangers of claim 6 wherein the means for engaging the surface surrounding the rim of the aperture is a detent.

8. The hangers of claim 6 wherein the prong is curved semi circular in a cross section.

9. A plurality of one-piece, resilient, stackable hangers adapted for attaching cables to a tower leg having a first thickness with an aperture therethrough, the hanger comprising:
    a generally U-shaped member having a center portion and legs;
    a cable engaging section in each leg adapted to engage a cable positioned between said legs in an axial orientation;
    a compliant area for flexing each of the legs in a direction transverse to the axial orientation; and
    an attachment section on the end of each of the legs opposite the center portion end of the legs;
    wherein
        the center portion includes
            an axially extending generally planar recessed area between coplanar areas, and
            a mounting aperture in the recessed area adapted for stacking engagement of an attachment section of a second hanger, wherein
                said recessed area and coplanar areas each have a second thickness less than said first thickness and have oppositely facing surfaces defining an effective thickness substantially equal to said first thickness, and
                said recessed area is connected to said coplanar areas by axially aligned connecting walls extending between the planes of the recessed and coplanar areas,
        said attachment section includes
            a prong adapted to extend through any one of said apertures,
            means for engaging a surface surrounding said any one of said apertures, and
            feet spaced no further than said first thickness from said associated engaging means in the direction of said thickness, and
        said coplanar areas are adapted to provide a base for the feet of a second hanger being stacked on the hanger.

10. The hangers of claim 9 further comprising a cable gripper extending inwardly from the cable engaging sections.

11. The hangers of claim 9 wherein each attachment section includes a prong, feet, and a means for engaging a surface surrounding a rim of the aperture.

12. The hangers of claim 11 wherein the means for engaging the surface surrounding the rim of the aperture is a detent.

13. A one-piece, resilient, stackable hanger adapted for attachment to an aperture, the hanger comprising:
    a generally U-shaped member having a center portion and legs;
    a cable engaging section in each leg adapted to engage a cable positioned between said legs in an axial orientation;
    a compliant area for flexing each of the legs in a direction transverse to the axial orientation; and
    an attachment section on the end of each of the legs opposite the center portion end of the legs;
    wherein the center portion includes
        an axially extending generally planar recessed area between coplanar areas, said recessed area connected to said coplanar areas by axially aligned connecting walls extending between the planes of the recessed and coplanar areas, and a mounting aperture in the recessed area adapted for stacking engagement of an attachment section of a second hanger.

14. The hanger of claim 13 further comprising a cable gripper extending inwardly from the cable engaging sections.

15. The hanger of claim 13 formed from a single unitary strip of resilient material.

16. The hanger of claim 15 wherein the hanger is formed from a continuous metal sheet.

17. The hanger of claim 13 wherein each attachment section includes a prong, feet, and a means for engaging a surface surrounding a rim of the aperture.

18. The hanger of claim 17 wherein the means for engaging the surface surrounding the rim of the aperture is a detent.

19. A one-piece, resilient, stackable hanger adapted for attaching a cable to a tower leg having a first thickness with an aperture therethrough, the hanger comprising:
- a generally U-shaped member having a center portion and legs;
- a cable engaging section in each leg adapted to engage a cable positioned between said legs in an axial orientation;
- a compliant area for flexing each of the legs in a direction transverse to the axial orientation; and
- an attachment section on the end of each of the legs opposite the center portion end of the legs;
- wherein the center portion includes
  - a generally planar recessed area between coplanar areas, wherein said recessed area and coplanar areas each have a second thickness less than said first thickness and have oppositely facing surfaces defining an effective thickness substantially equal to said first thickness, and
  - a mounting aperture in the recessed area adapted for stacking engagement of an attachment section of a second hanger.

20. The hanger of claim 19 formed from a single unitary strip of resilient material.

21. The hanger of claim 20 wherein the hanger is formed from a continuous metal sheet.

22. The hanger of claim 19 wherein each attachment section includes a prong, feet, and a means for engaging a surface surrounding a rim of the aperture.

23. The hanger of claim 22 wherein the means for engaging the surface surrounding the rim of the aperture is a detent.

* * * * *